US012189327B2

(12) United States Patent
Kakitani

(10) Patent No.: US 12,189,327 B2
(45) **Date of Patent: *Jan. 7, 2025**

(54) IMAGE FORMING APPARATUS

(71) Applicant: CANON KABUSHIKI KAISHA, Tokyo (JP)

(72) Inventor: Masaki Kakitani, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/450,478

(22) Filed: Aug. 16, 2023

(65) Prior Publication Data

US 2023/0400808 A1 Dec. 14, 2023

Related U.S. Application Data

(63) Continuation of application No. 17/719,547, filed on Apr. 13, 2022, now Pat. No. 11,762,325.

(30) Foreign Application Priority Data

Apr. 23, 2021 (JP) ................................ 2021-073475
Mar. 22, 2022 (JP) ................................ 2022-045410

(51) Int. Cl.
*G03G 21/16* (2006.01)

(52) U.S. Cl.
CPC ..... *G03G 21/1633* (2013.01); *G03G 21/1619* (2013.01); *G03G 2221/1654* (2013.01)

(58) Field of Classification Search
CPC .......... G03G 21/1633; G03G 21/1619; G03G 2221/1654; G03G 2221/169; G03G 2221/1678
See application file for complete search history.

(56) References Cited

U.S. PATENT DOCUMENTS

| | | | | |
|---|---|---|---|---|
| 10,167,166 | B2 | 1/2019 | Kakitani | |
| 11,281,152 | B1 | 3/2022 | Kokubu | |
| 11,762,325 | B2 * | 9/2023 | Kakitani | G03G 21/1633 399/110 |
| 2016/0033928 | A1 | 2/2016 | Ishimitsu et al. | |
| 2016/0291534 | A1 | 10/2016 | Maeda et al. | |
| 2017/0227898 | A1 * | 8/2017 | Kakitani | G03G 21/1633 |

FOREIGN PATENT DOCUMENTS

| | | |
|---|---|---|
| JP | 8-171326 A | 7/1996 |
| JP | 2018-005182 A | 1/2018 |

* cited by examiner

*Primary Examiner* — Sandra Brase
(74) *Attorney, Agent, or Firm* — Venable LLP

(57) ABSTRACT

An image forming apparatus including: an image forming unit configured to form an image on a recording medium: an upper surface cover which is provided to an upper surface of the image forming apparatus and forms at least a part of an appearance of the image forming apparatus; a first cover which is provided to a front surface of the image forming apparatus and forms at least a part of the appearance of the image forming apparatus; and a second cover which is provided to the front surface of the image forming apparatus so as to be located above the first cover and forms at least a part of the appearance of the image forming apparatus. The first cover includes a resin material. The second cover includes a ferromagnetic material.

15 Claims, 12 Drawing Sheets

IMAGE FORMING APPARATUS

CROSS-REFERENCE TO RELATED APPLICATIONS

This application is a continuation application of U.S. patent application Ser. No. 17/719,547, filed Apr. 13, 2022, which claims the benefit of Japanese Patent Application No. 2021-073475, filed Apr. 23, 2021, and Japanese Patent Application No. 2022-045410, filed Mar. 22, 2022. All of these prior applications are hereby incorporated by reference herein in their entirety.

BACKGROUND OF THE INVENTION

Field of the Invention

The present invention relates to an image forming apparatus including covers.

Description of the Related Art

Hitherto, an electrophotographic digital multifunction peripheral has been widely used as a multifunction peripheral having a plurality of functions of, for example, an original reader, a printer, and a facsimile machine, mainly in office operations. Meanwhile, nowadays, there is an increasing number of occasions where the digital multifunction peripheral is used in commercial printing because of, for example, increase in diversified small-lot printing. The digital multifunction peripheral has functions additional to functions of a digital multifunction peripheral that has been manufactured based on its supposed use in offices, and has been developed for commercial printing. Thus, the original digital multifunction peripheral generally includes an exterior made of a resin for the purposes of reduction in weight and cost (Japanese Patent Application Laid-Open No. 2018-005182).

In commercial printing, diversified small-lot resultants are to be obtained by printing in many cases. More specifically, for example, a kind of sheet, a sheet size, and whether or not post-processing is to be performed are different for each print job, and thus printing becomes complicated. Thus, it is important to display, for example, a specification sheet, a precautionary statement sheet, or a note for work for the print job at a location where an operator (user) operating an image forming apparatus can view the sheet so as to be able to read and understand what is written without misreading.

A bulletin board such as a whiteboard can also be used so that a work description of a print job is read and understood without being misread. In consideration of, for example, an installation space for or cost of the bulletin board, however, it is often difficult to use the bulletin board. Thus, hitherto, for example, a specification sheet, a precautionary statement sheet, or a note for work for the print job has been attached to an apparatus main body with an adhesive tape. It may be impossible to secure a place where an instruction sheet is attached or stuck so as to be visible and readable without hindering the work depending on a shape of the apparatus main body. Thus, a sheet such as a note for work is attached with an adhesive tape at a position with poor visibility such as on a lower portion of the apparatus in some cases. When a note for work is attached to the apparatus main body with the adhesive tape, however, there arise problems in terms of workability and appearance quality such as time and effort required to replace the note for work with another one and a part of adhesive remaining on a surface of the exterior after removal of the adhesive tape.

SUMMARY OF THE INVENTION

The present invention provides an image forming apparatus on which an instruction sheet can be stuck with a magnet at a position which is easy for workers to see.

According to an embodiment of the present invention, there is provided an image forming apparatus including an image forming unit configured to form an image on a recording medium, the image forming apparatus comprising:

- an upper surface cover which is provided to an upper surface of the image forming apparatus in a vertical direction and forms at least a part of an appearance of the image forming apparatus;
- a first cover which is provided to a front surface of the image forming apparatus in a front-back direction and forms at least a part of the appearance of the image forming apparatus; and
- a second cover which is provided to the front surface of the image forming apparatus in the front-back direction so as to be located above the first cover in the vertical direction and forms at least a part of the appearance of the image forming apparatus,
- wherein the first cover includes a resin material, and
- wherein the second cover includes a ferromagnetic material.

Further features of the present invention will become apparent from the following description of exemplary embodiments with reference to the attached drawings.

DESCRIPTION OF THE EMBODIMENTS

Figure 1:
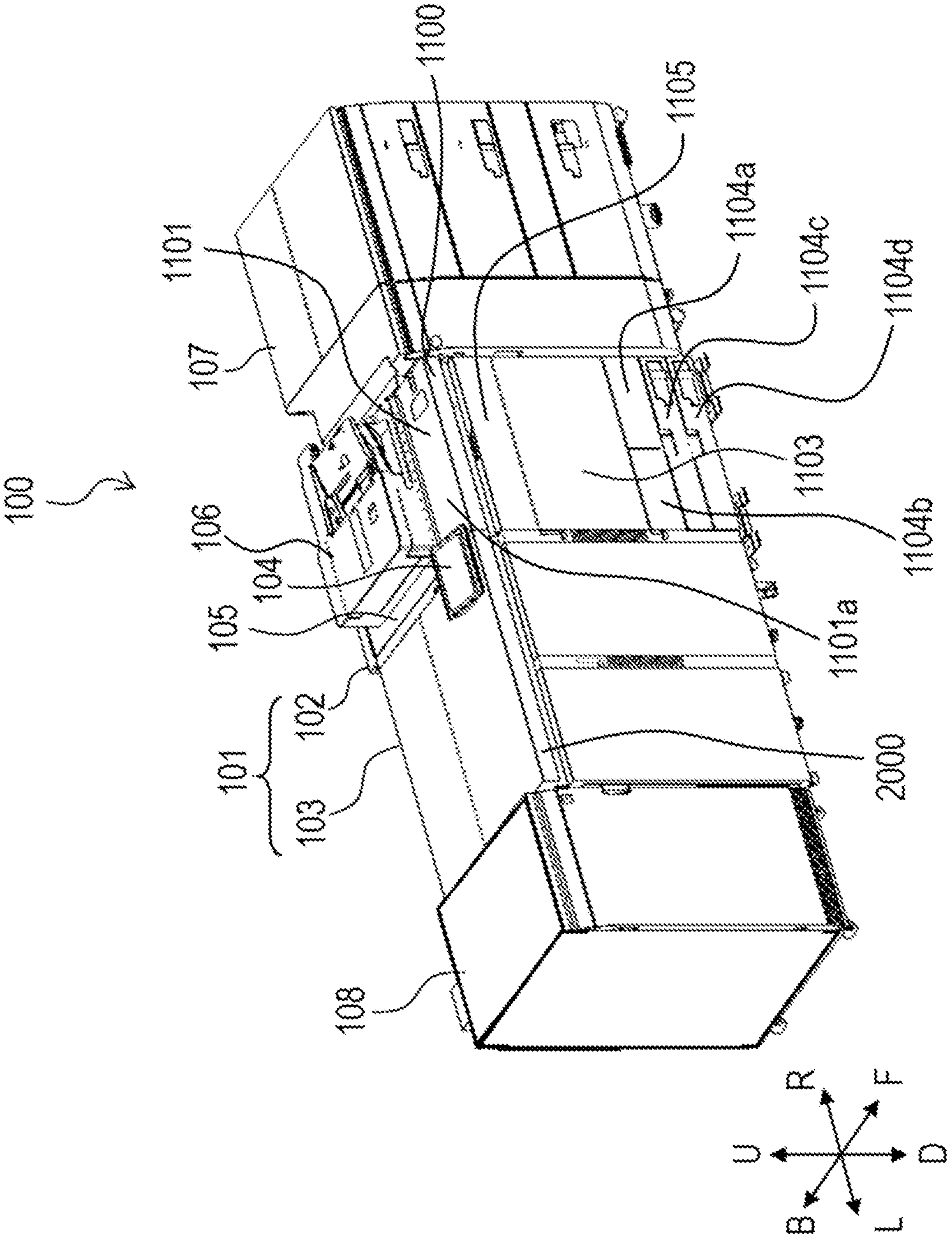
FIG. 1 is a perspective view of an image forming system.

Embodiments of the present invention are described below. The embodiments of the present invention are illustratively described in detail below with reference to the drawings. In the embodiment, as illustrated in FIG. 1, a direction from an image forming apparatus 101 toward its front side is referred to as "forward direction F", a direction toward its back side (rear side) is referred to as "backward direction B", a direction toward its left side is referred to as "leftward direction L", a direction toward its right side is referred to as "rightward direction R", a direction toward its upper side is referred to as "upward direction U", and a direction toward its lower side is referred to as "downward direction D". However, for example, dimensions, materials, shapes, and relative positions of components described below in the embodiment should be suitably changed based on a configuration of an apparatus to which the present invention is applied or various conditions. Thus, the scope of the present invention is not intended to be limited to those described in the embodiment.

First Embodiment (Image Forming System)

Figure 2:
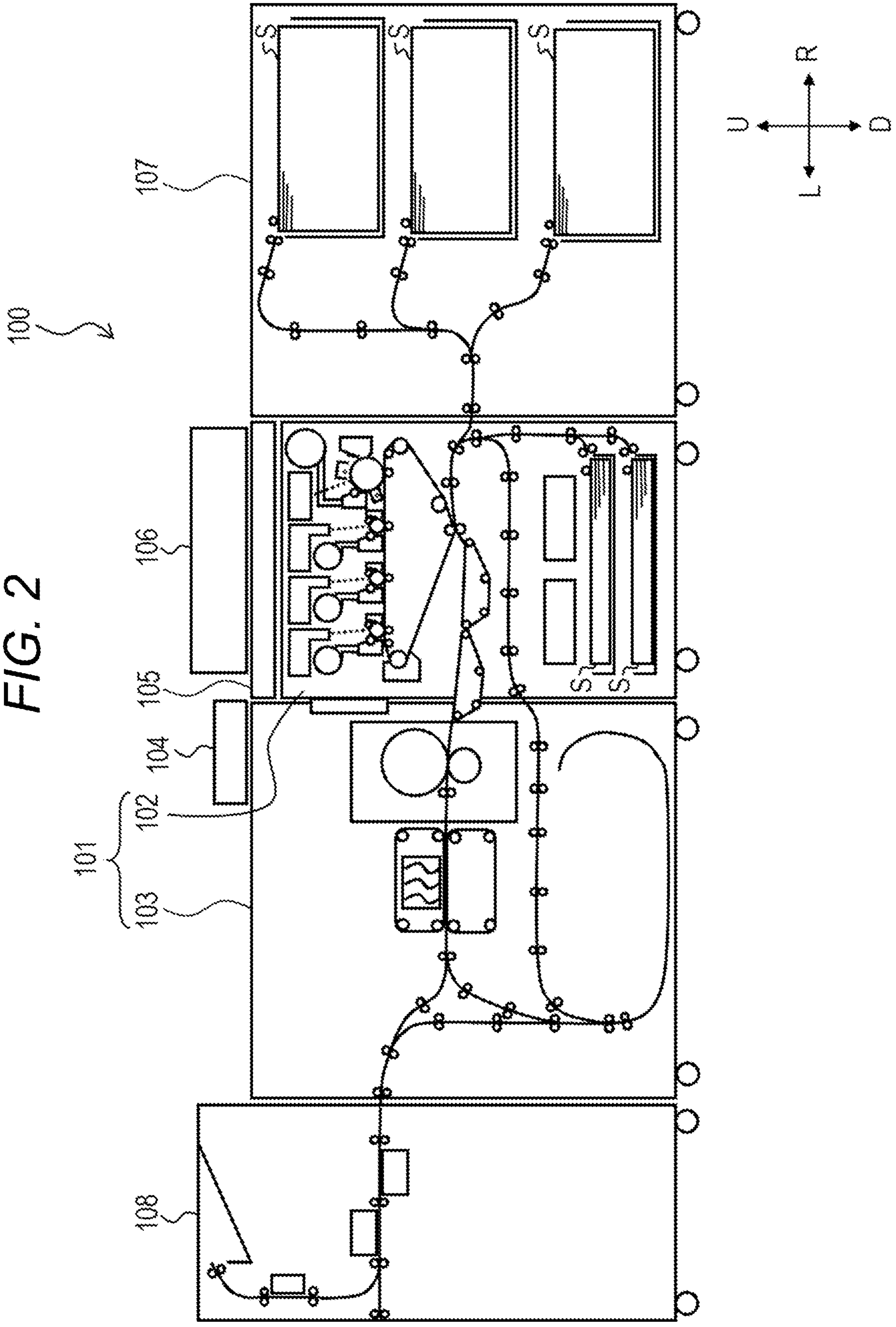
FIG. 2 is a sectional view of the image forming system.

FIG. 1 is a perspective view of an image forming system 100. FIG. 2 is a sectional view of the image forming system 100. The image forming system 100 includes the image forming apparatus 101, a high-capacity feeder 107, and a sensing device 108. The image forming apparatus 101 includes an image forming portion 102 and a fixing conveyance portion (fixing portion) 103. The image forming portion 102 forms a toner image on a recording medium (hereinafter referred to as "sheet") S fed from the high-capacity feeder (feeder) 107. The fixing conveyance portion 103 fixes the toner image formed by the image forming portion 102 onto the sheet S. Each of the image forming portion 102 and the fixing conveyance portion 103 includes a casing, and the casings are independent of each other. With this configuration, the image forming apparatus 101 having a large size can be packed and transported after being separated into the casings. Such a configuration also improves workability in the distribution of the image forming apparatus 101 having a large size, which involves shipping and installation.

Figure 5:
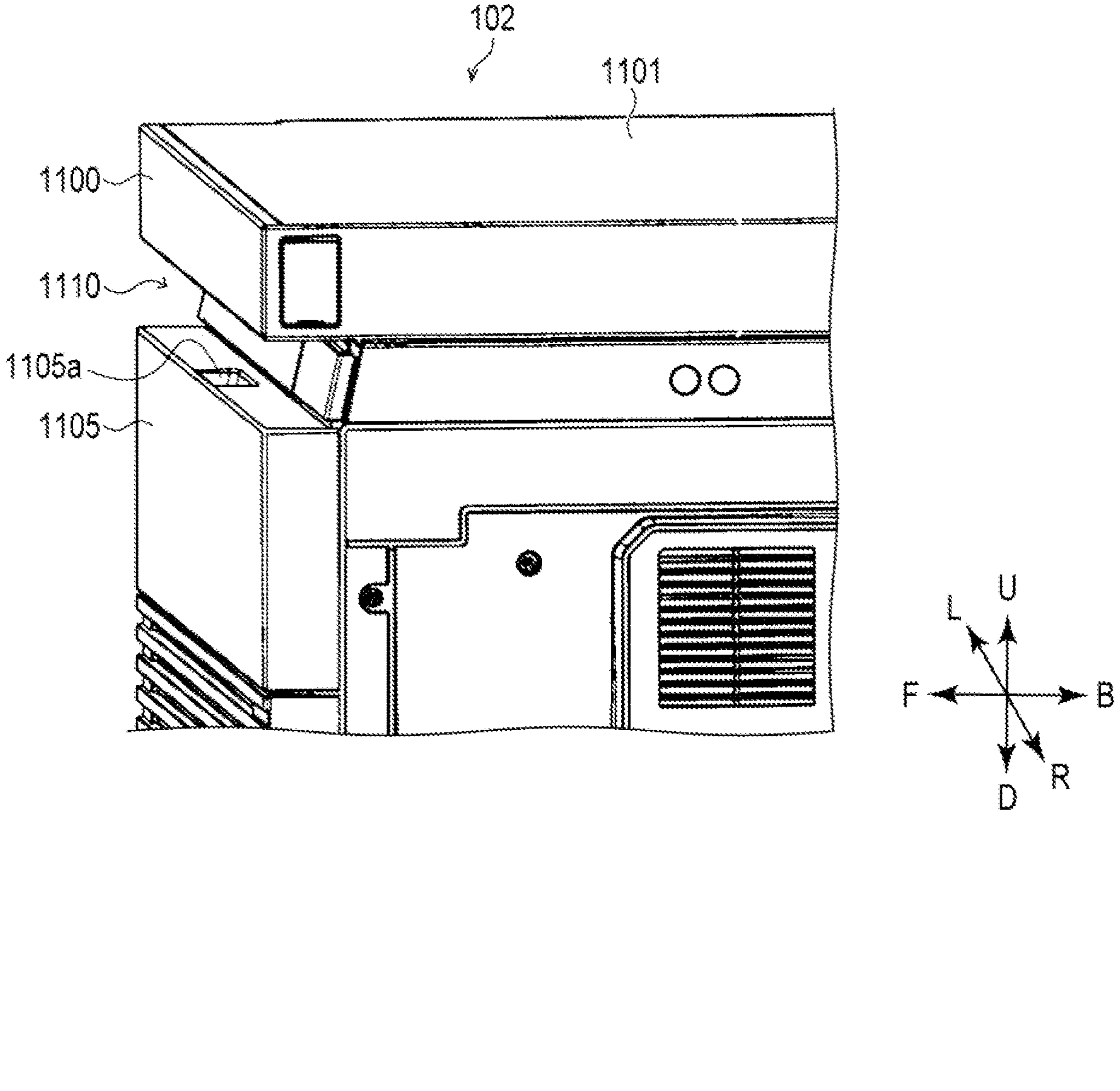
FIG. 5 is a perspective view of an upper portion of an image forming apparatus.

An operation portion 104 is provided on top of the fixing conveyance portion 103. The operation portion 104 is used by an operator to operate the image forming apparatus 101. The arrangement of the operation portion 104 on an upper surface of the image forming system 100 can be suitably changed. For example, the operation portion 104 can be arranged at a position desired by a user, such as a position on an upper surface of the image forming portion 102, as illustrated in FIG. 5. An original reader 105 and an automatic original feeder 106 are provided on top of the image forming portion 102. The automatic original feeder 106 feeds originals from a bundle of originals stacked thereon one by one to the original feeder 105. The original feeder 105 reads an image of the original fed by the automatic original feeder 106 or an image of an original placed on a platen glass plate (not shown). Optionally, the original reader 105 and the automatic original feeder 106 are selectively connected to the image forming portion 102.

The high-capacity feeder 107 is arranged on an upstream side of the image forming portion 102 in a sheet conveying direction. The high-capacity feeder 107 includes a plurality of sheet storage portions. In place of the high-capacity feeder 107, a manual feeder (not shown) or a long-sheet feeder (not shown) capable of containing long sheets may be selectively connected to the image forming portion 102. Further, another high-capacity feeder (not shown), another manual feeder (not shown), or another long-sheet feeder may be arranged on an upstream side of the high-capacity feeder 107 and be selectively connected thereto so as to achieve double-feeder connection.

The sensing device 108 is arranged on a downstream side of the fixing conveyance portion 103 in the sheet conveying direction. The image forming system 100 is not always required to include the sensing device 108. The sensing device 108 is selectively connected to the fixing conveyance portion 103. Thus, when the sensing device 108 is connected to the fixing conveyance portion 103, the sheet on which an image has been formed by the image forming apparatus 101 is delivered to the sensing device 108. When the sensing device 108 is not connected to the fixing conveyance portion 103, the sheet on which the image has been formed by the image forming apparatus 101 is delivered to an outside of the image forming apparatus 101 through, for example, a delivery tray (not shown) provided to the image forming apparatus 101 or a finisher connected to the image forming apparatus 101.

The sensing device 108 reads an image formed on one or each of surfaces of the sheet S, and detects an image density deviation and an image position misregistration. The sensing device 108 performs feedback correction on an image signal to be transmitted to the image forming portion 102 based on the detected image density deviation and image position misregistration. One of or a combination of a plurality of post-processing apparatus (not shown) such as an inserter, a puncher, a case binding machine, a high-capacity stacker, a folding machine, a finisher, and a trimmer is arranged on a downstream side of the fixing conveyance portion 103 or the sensing device 108, and is selectively connected to the fixing conveyance portion 103 or the sensing device 108 of the image forming system 100. When the post-processing apparatus is connected in this manner, the sheet on which the image has been formed by the image forming apparatus 101 is delivered to, for example, a delivery tray provided to the post-processing apparatus.

As described above, when a variety of optional apparatus are selectively connected to the image forming apparatus 101 according to the embodiment, resultants obtained by performing a variety of post-processing processes on a variety of sheets can be output inline. Thus, the image forming system 100 with high productivity, high image quality, high stability, and high functionality is achieved.

(Image Forming Portion)

Figure 3A:
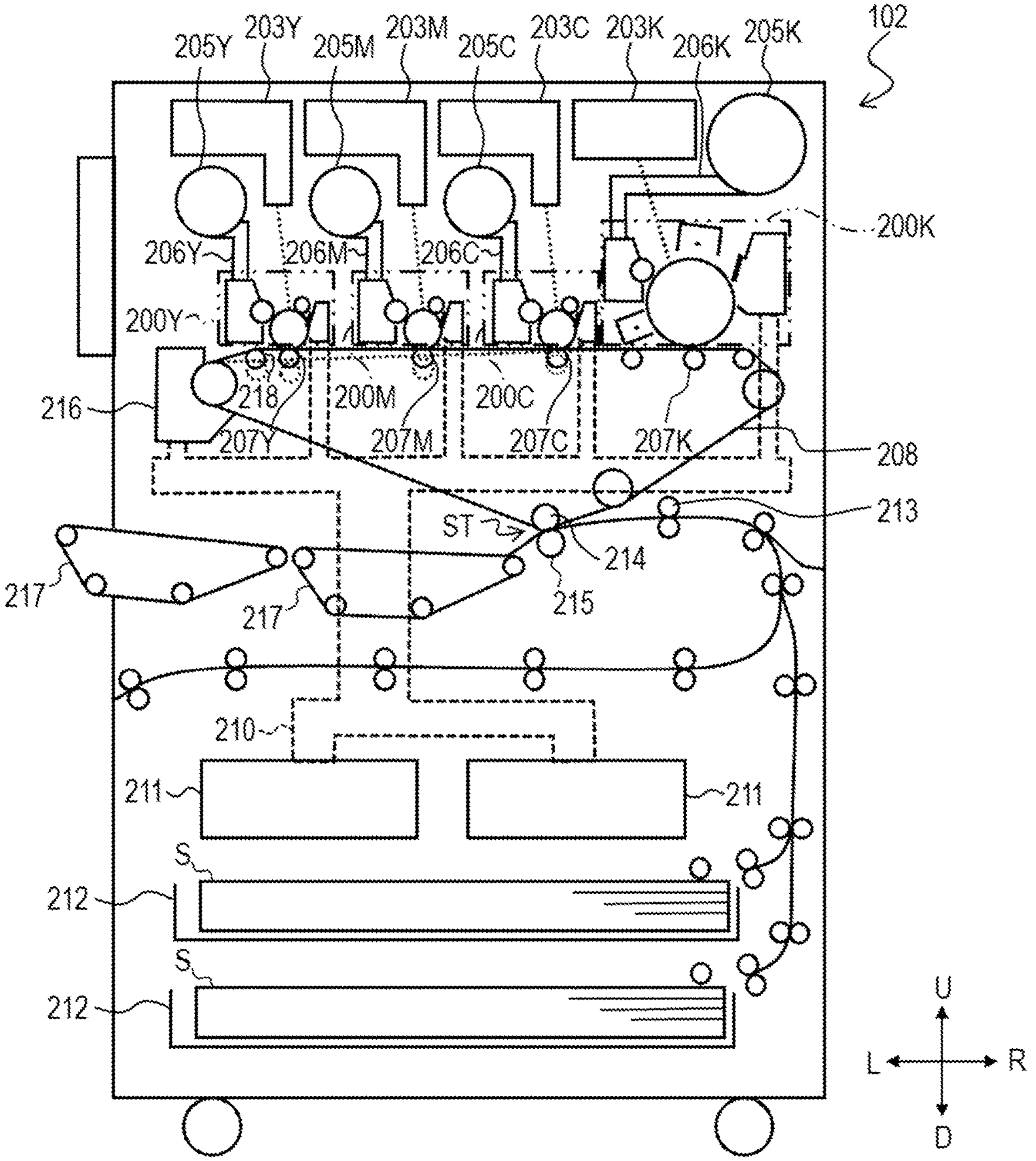
FIG. 3A is a sectional view of an image forming portion.
Figure 3B:
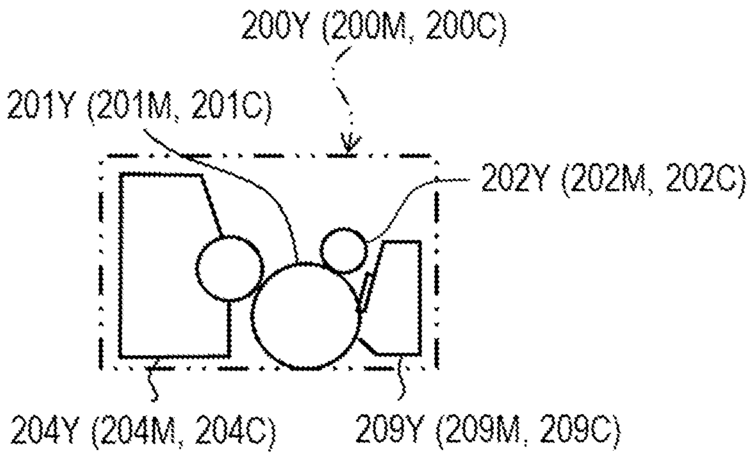
FIG. 3B is a view of a yellow image forming station.

The image forming portion 102 of the image forming apparatus 101 according to the embodiment is described with reference to FIG. 3A, FIG. 3B, and FIG. 3C. FIG. 3A is a sectional view of the image forming portion 102. The image forming portion 102 includes a yellow image forming station 200Y, a magenta image forming station 200M, a cyan image forming station 200C, and a black image forming station 200K as image forming units. The image forming portion 102 includes laser scanners 203Y, 203M, 203C, and 203K, toner bottles (toner containers) 205Y, 205M, 205C, and 205K, and toner supply paths 206Y, 206M, 206C, and 206K. Suffixes Y, M, C, and K to the reference symbols represent yellow, magenta, cyan, and black, respectively. In the following description, the suffixes Y, M, C, and K may be omitted unless otherwise needed. Further, the image forming portion 102 includes primary transfer rollers 207Y, 207M, 207C, and 207K, an intermediate transfer belt 208, a toner collecting path 210, collected toner containers 211, and sheet storage portions 212. Further, the image forming portion 102 includes registration rollers 213, a secondary transfer inner roller 214, a secondary transfer outer roller 215, an intermediate transfer belt cleaner 216, pre-fixing conveyance belts 217, and an auxiliary primary transfer roller 218. A nip portion between the secondary transfer inner roller 214 and the secondary transfer outer roller 215 defines a secondary transfer portion ST.

The yellow image forming station 200Y forms a yellow (Y) toner image. The magenta image forming station 200M forms a magenta (M) toner image. The cyan image forming station 200C forms a cyan (C) toner image. The yellow image forming station 200Y, the magenta image forming station 200M, and the cyan image forming station 200C have the same structure. FIG. 3B is a view of the yellow image forming station 200Y In FIG. 3B, the reference symbols for denoting the structures of the magenta image forming station 200M and the cyan image forming station 200C are parenthesized. The yellow image forming station 200Y (200M, 200C) includes a photosensitive drum 201Y (201M, 201C). A primary charger 202Y (202M, 202C), a developing device 204Y (204M, 204C), and a photosensitive drum cleaner 209Y (209M, 209C) are provided around the photosensitive drum 201Y (201M, 201C). The primary charger 202Y (202M, 202C) is a charging roller.

Figure 3C:
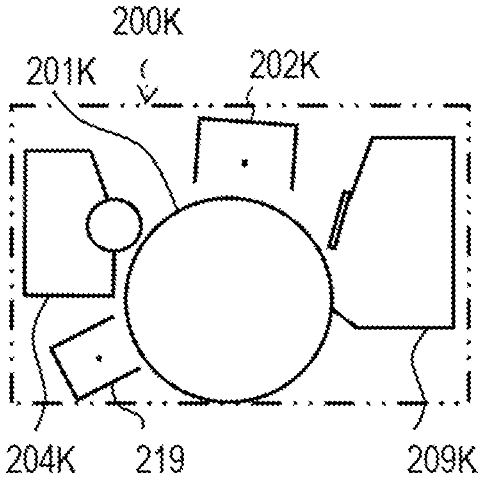
FIG. 3C is a view of a black image forming station.

FIG. 3C is a view of the black image forming station 200K. The black image forming station 200K forms a black (K) toner image. The black image forming station 200K includes a photosensitive drum 201K. A primary charger 202K, a developing device 204K, a pre-transfer charger 219, and a photosensitive drum cleaner 209K are provided around the photosensitive drum 201K. The primary charger 202K is a corona charger.

(Image Forming Process)

Image forming processes performed in the yellow image forming station 200Y, the magenta image forming station 200M, the cyan image forming station 200C, and the black image forming station 200K are substantially the same except for colors of the toners. Now, the image forming process performed in the yellow image forming station 200Y is described. As illustrated in FIG. 3B, a surface of the photosensitive drum 201Y of the yellow image forming station 200Y is uniformly charged by the primary charger 202Y As illustrated in FIG. 3A, the laser scanner 203Y emits a laser beam to the photosensitive drum 201Y in accordance with image data to form an electrostatic latent image on the surface of the photosensitive drum 201Y The developing device 204Y develops the electrostatic latent image with a yellow toner to form a yellow toner image on the surface of the photosensitive drum 201Y When the toner in the developing device 204Y is used for the development, the yellow toner is suitably supplied from the toner bottle 205Y to the developing device 204Y through the toner supply path 206Y A predetermined pressurizing force and an electrostatic load bias are applied by the primary transfer roller 207Y to the toner image on the surface of the photosensitive drum 201Y, and the toner image is transferred onto the intermediate transfer belt 208. After the transfer, a small amount of toner remaining on the photosensitive drum 201Y is removed by the photosensitive drum cleaner 209Y The toner removed by the photosensitive drum cleaner 209Y is collected in the collected toner containers 211 through the toner collecting path 210.

Similarly, the magenta image forming station 200M, the cyan image forming station 200C, and the black image forming station 200K form a magenta toner image, a cyan toner image, and a black toner image, respectively. The magenta toner image, the cyan toner image, and the black toner image are transferred onto the intermediate transfer belt 208 in order. As a result, the toner images of the four colors are superimposed on the intermediate transfer belt 208.

Meanwhile, the sheets S are fed one by one from the sheet storage portions 212 of the image forming portion 102 or the high-capacity feeder 107, and are conveyed to the registration rollers 213. A leading edge of the sheet S is brought into abutment against a nip portion defined between the registration rollers 213 being in a stopped state to cause the sheet S to have a loop. In this manner, skew of the sheet S is corrected. After that, the registration rollers 213 start rotating and convey the sheet S to the secondary transfer portion ST so that a leading edge of the toner image on the intermediate transfer belt 208 and the leading edge of the sheet S are aligned with each other at the secondary transfer portion ST. A predetermined pressurizing force and an electrostatic load bias are applied, by the secondary transfer portion ST, to the toner image on the intermediate transfer belt 208, and the toner image is transferred onto the sheet S. After the transfer, a small amount of toner remaining on the intermediate transfer belt 208 is removed by the intermediate transfer belt cleaner 216. The toner removed by the intermediate transfer belt cleaner 216 is collected in the collected toner containers 211 through the toner collecting path 210. The sheet S carrying the toner image transferred thereto is conveyed to the fixing conveyance portion 103 by the pre-fixing conveyance belts 217.

(Fixing Conveyance Portion)

Figure 4:
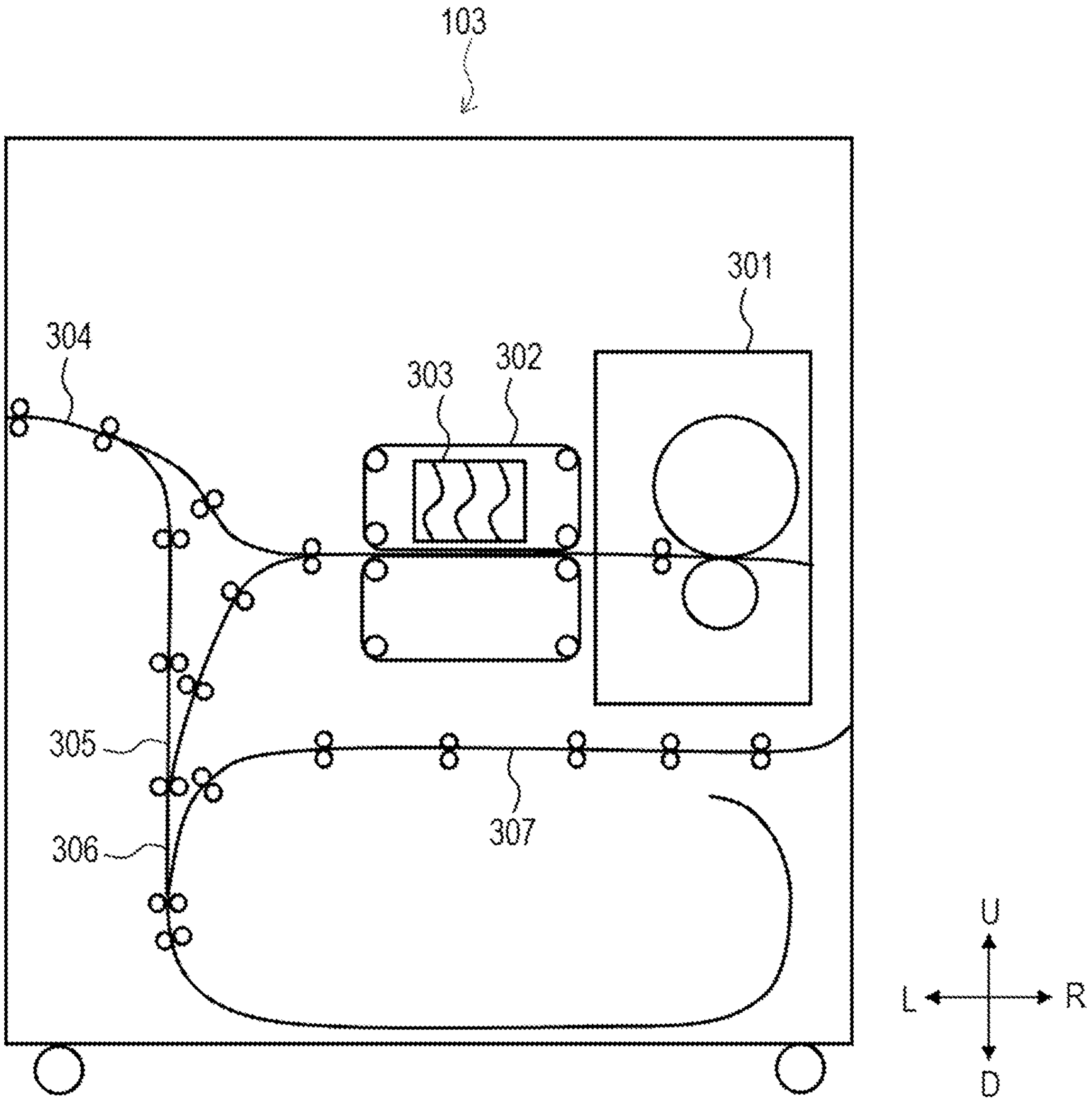
FIG. 4 is a sectional view of a fixing conveyance portion.

FIG. 4 is a sectional view of the fixing conveyance portion 103. The fixing conveyance portion 103 includes a fixing device 301, a cooler 302, a heat sink 303, a delivery conveyance path 304, a delivery reversing portion 305, a double-sided reversing portion 306, and a double-sided conveyance path 307. The fixing device 301 heats and pressurizes the toner image on the sheet S conveyed from the image forming portion 102 to fix the toner image onto the sheet S. The sheet S, which has been heated by the fixing device 301, is cooled through heat absorption by the heat sink 303 disposed in the cooler 302. The sheet S is delivered to the sensing device 108 via the delivery conveyance path 304. In a case in which the sheet S is delivered after being reversed, the sheet S is switched back at the delivery reversing portion 305 to switch a leading edge and a trailing edge of the sheet S. The sheet S, which has been reversed, is delivered via the delivery conveyance path 304.

Further, in a case in which images are formed on both sides of the sheet S, the sheet S carrying an image on a first side is switched back at the double-sided reversing portion 306 to switch a leading edge and a trailing edge of the sheet S. The sheet S, which has been reversed, is conveyed to the double-sided conveyance path 307. After that, the sheet S and subsequent sheets fed from the sheet storage portions 212 of the image forming portion 102 or the high-capacity feeder 107 are conveyed to the registration rollers 213 in order. Then, after an image is formed on a second side of the sheet S through the same image forming process as that for the first side, the sheet S is delivered via the delivery conveyance path 304.

(Monochrome Image Formation)

As described above, the image forming apparatus 101 according to the embodiment forms a full-color image by using the yellow image forming station 200Y, the magenta image forming station 200M, the cyan image forming station 200C, and the black image forming station 200K. The image forming apparatus 101 can also form a monochrome image by using only the black image forming station 200K. When a monochrome image is formed, the primary transfer rollers 207Y, 207M, and 207C, the auxiliary primary transfer roller 218, and the intermediate transfer belt 208 are moved by a separation mechanism (not shown) to positions indicated by dotted lines in FIG. 3A. Rotational driving of the yellow image forming station 200Y, the magenta image forming station 200M, and the cyan image forming station 200C, which are separate from the intermediate transfer belt 208, is stopped. Specifically, undesirable wear of components, which may be caused along with unnecessary rotational driving, is prevented in the yellow image forming station 200Y, the magenta image forming station 200M, and the cyan image forming station 200C to thereby extend a life of each of the components.

The black photosensitive drum 201K has a diameter larger than those of the yellow photosensitive drum 201Y, the magenta photosensitive drum 201M, and the cyan photosensitive drum 201C, and thus has a life longer than those of the yellow photosensitive drum 201Y, the magenta photosensitive drum 201M, and the cyan photosensitive drum 201C. Further, the black primary charger 202K is a non-contact type corona charger, and has a life longer than those of the yellow primary charger 202Y, the magenta primary charger 202M, and the cyan primary charger 202C, which are contact type charger rollers. The black toner bottle 205K has a capacity larger than those of the yellow toner bottle 205Y, the magenta toner bottle 205M, and the cyan toner bottle 205C, and is suitable to achieve a longer life. When the monochrome image formation is frequently performed, maintenance on the black image forming station 200K, which is used at a higher frequency, is performed at shorter intervals. However, the above-mentioned configuration prevents the intervals of maintenance on the black image forming station 200K from becoming shorter than those for the yellow image forming station 200Y, the magenta image forming station 200M, and the cyan image forming station 200C, which are used at a lower frequency.

Further, the black image forming station 200K employs a large-diameter drum structure using the corona charger as the primary charger 202K. The black image forming station 200K has a charging width larger than those of small-diameter drum structures using the charging rollers as the primary chargers 202Y, 202M, and 202C, and thus has a structure suitable to achieve a higher speed. Hence, the black image forming station 200K enables the image forming portion 102 to achieve improved productivity in monochrome image formation.

The yellow image forming station 200Y, the magenta image forming station 200M, and the cyan image forming station 200C are different from the black image forming station 200K in shape, which may lead to different abrasion amounts of the components. Thus, a difference in toner charging amount may occur between each of the photosensitive drums 201Y, 201M, and 201C and the photosensitive drum 201K. When a difference occurs in toner charging amount, an unsatisfactory image may be formed because of ununiform transfer of the toner images onto the sheet S in a secondary transfer step. Thus, the black photosensitive drum 201K includes the pre-transfer charger 219, which is a corona charger, so as to achieve the same toner charging amount as those achieved by the yellow photosensitive drum 201Y, the magenta photosensitive drum 201M, and the cyan photosensitive drum 201C. As described above, with the configuration according to the embodiment, the image forming apparatus 101 with high productivity, high image quality, high stability, and a long life not only in full-color image formation but also in monochrome image formation is provided.

In current commercial printing industry, a front side to back side image alignment function and media-enabling functions are additionally provided to a related-art office digital multifunction peripheral so that the resulting digital multifunction peripheral is used as a compact commercial printing machine in some cases. The commercial printing machine manufactured by adding required functions to the digital multifunction peripheral is suitable mainly for diversified small-lot printing.

In diversified small-lot printing, each print job may be performed under different conditions such as a kind of paper sheet, a sheet size, half fold, punching, and staple-binding. Further, even in diversified large-lot printing, each print job may be performed under different conditions such as a kind of paper sheet, a sheet size, half fold, punching, and staple-binding. In actual printing work, a worker (operator) often performs printing work in accordance with an instruction sheet of, for example, A4 size, which describes conditions of a print job. Thus, in order to efficiently proceed with the printing work without mistaking the conditions of the print job, it is necessary to display the instruction sheet in a place where the worker can view and read the instruction sheet. Further, when, for example, a piece of memo paper smaller than a A4-sized sheet, which describes matters required for the printing work, such as a message for handover of the work and cautions for image adjustment, is similarly displayed in addition to the instruction sheet, resultants with higher quality can be more effectively obtained by printing.

A bulletin board such as a whiteboard can also be used so that a work description of a print job is read and understood without being misread. In consideration of, for example, an installation space for or cost of the bulletin board, however, it is often difficult to use the bulletin board. Thus, hitherto, the worker attaches, for example, a specification sheet, a precautionary statement sheet, or a note for work for the print job to the image forming apparatus with an adhesive tape in some cases. When a note for work is attached to the image forming apparatus with the adhesive tape, however, there arise problems in terms of workability and appearance quality such as time and effort required to replace the note for work with another one and a part of adhesive remaining on a surface of the exterior after removal of the adhesive tape. Further, it may be impossible to secure a place where an instruction sheet is attached or stuck so as to be visible and readable without hindering the work depending on a shape of the image forming apparatus. Thus, a sheet such as a note for work is attached with an adhesive tape at a position with poor visibility, such as on a lower portion of the apparatus in some cases. Thus, in the embodiment, a ferromagnetic cover 1100 is provided to an upper portion of a front surface of the image forming portion 102 so that an instruction sheet can be stuck with a magnet at a position which is easy for the worker to see. Details of a configuration of the ferromagnetic cover 1100 are described below.

As illustrated in FIG. 1, the ferromagnetic cover (second cover) 1100 is provided to the front surface side of the upper portion of the image forming portion 102. The ferromagnetic cover 1100 is provided on a front surface of the image forming apparatus 101 in a front-back direction, and is located above a front door 1103 in a vertical direction. The ferromagnetic cover 1100 forms at least a part of an appearance of the image forming apparatus 101. An upper surface cover 1101 is provided to a top of the image forming portion 102. The upper surface cover 1101 is provided to an upper surface of the image forming apparatus 101 in the vertical direction, and forms at least a part of the appearance of the image forming apparatus 101. The upper surface cover 1101 includes a flat surface portion 1101*a*. The flat surface portion 1101*a* is located as an upper portion of the upper surface cover 1101 so as to be used by a user as a working space. The operation portion 104 is provided on the upper surface cover 1101 at a position closer to a front side of the image forming apparatus 101. The user can perform work on the flat surface portion 1101*a* of the upper surface cover 1101. The work includes alignment of the sheets S delivered from the image forming apparatus 101 and checking for an image defect in the image formed on the sheet S.

The front door (first cover) 1103 is provided on the front surface of the image forming portion 102 in the front-back direction. The front door 1103 is openable and closable about its one side as a center of rotation. The front door 1103 forms at least a part of the appearance of the image forming apparatus 101. At a time of maintenance on the image forming apparatus 102 or fixing a jam therein, a user opens the front door 1103 to make access to an inside of the image forming portion 102 so as to perform work. Covers 1104*a*, 1104*b*, 1104*c*, and 1104*d* are provided to a lower portion of the image forming portion 102. The covers 1104*a*, 1104*b*, 1104*c*, and 1104*d* cover the sheet storage portions 212 that store the sheets S. Further, a toner bottle replacement door 1105 is provided to the upper portion of the image forming portion 102, and is located between the front door 1103 and the ferromagnetic cover 1100. The toner bottle replacement door 1105 covers an insertion portion into which the toner bottles can be inserted. The upper surface cover 1101, the front door 1103, the covers 1104*a*, 1104*b*, 1104*c*, and 1104*d*, and the toner bottle replacement door 1105 are made of a resin. A resin material is, for example, a blend of a polycarbonate (PC) resin and an acrylonitrile-butadiene-styrene (ABS) resin (PC-ABS resin). The PC-ABS resin is a thermoplastic resin having features of both the PC resin and the ABS resin.

The ferromagnetic cover 1100 is provided to an uppermost portion of the front surface of the image forming portion 102. The ferromagnetic cover 1100 is made from a ferromagnetic material such as stainless use steel (SUS) 403, iron, or nickel. It is preferred that the ferromagnetic cover 1100 be made from any one of SUS 400 series stainless steels. The stainless steels of SUS 400 series include martensitic stainless steels and ferritic stainless steels. In the embodiment, the ferromagnetic cover 1100 is made from SUS 403 in terms of design quality and scratch resistance. For example, the ferromagnetic cover 1100 made from a ferromagnetic material is only required to be partially or entirely formed of a stainless steel plate made of a ferromagnetic material. In the embodiment, the ferromagnetic cover 1100 is formed by bending a stainless steel plate made of SUS 403. However, the ferromagnetic cover 1100 may also be formed by mounting a stainless steel plate made of SUS 403 onto a cover made from a resin material.

According to the embodiment, an instruction sheet or a piece of memo paper can be removably stuck with a magnet (permanent magnet) to the ferromagnetic cover 1100 provided to the uppermost portion of the front surface of the image forming portion 102. The reason why the ferromagnetic cover 1100 is provided to the uppermost portion of the front surface of the image forming portion 102 is that the worker often performs printing work while standing. The instruction sheet used by the worker is easier to see when stuck to the uppermost portion of the front surface of the image forming portion 102 than when stuck to, for example, the cover 1104*a*, 1104*b*, 1104*c*, or 1104*d* provided to the lower portion of the image forming portion 102. Further, when the instruction sheet is stuck to the flat surface portion 1101*a* of the upper surface cover 1101 with use of a magnet, the instruction sheet may be an obstacle to work when the worker performs the work such as alignment of the sheets or checking for an image defect on the sheet on the flat surface portion 1101*a*. Thus, in the embodiment, the ferromagnetic cover 1100 is provided to the uppermost portion of the front surface of the image forming portion 102. As described above, in the embodiment, the ferromagnetic cover 1100 made of a ferromagnetic material that is less liable to be scratched is used in a configuration in which a magnet can be stuck to a part of an exterior cover forming the appearance of the image forming apparatus 101. With the material and the arrangement described above, even when the instruction sheet or the magnet rubs against the ferromagnetic cover 1100, the ferromagnetic cover 1100 is less liable to be scratched. Thus, reduction in appearance quality can suppressed.

FIG. 5 is a perspective view of the upper portion of the image forming portion 102 when viewed from the right side. A recessed portion 1110 is provided between the ferromagnetic cover 1100 and the toner bottle replacement door 1105. To remove apiece of memo paper that is stuck to the ferromagnetic cover 1100 with a magnet, the worker can easily remove the piece of memo paper by inserting the worker's finger into the recessed portion 1110 and touching a back surface of the piece of memo paper. The recessed portion 1110 secures a space behind the back surface of the piece of paper, which further improves workability. Further, the recessed portion 1110 is formed so as to allow the user to easily operate a handle portion 1105*a* of the toner bottle replacement door 1105. Specifically, the recessed portion 1110 is formed so as to allow access to the handle portion 1105*a*.

Figure 6:
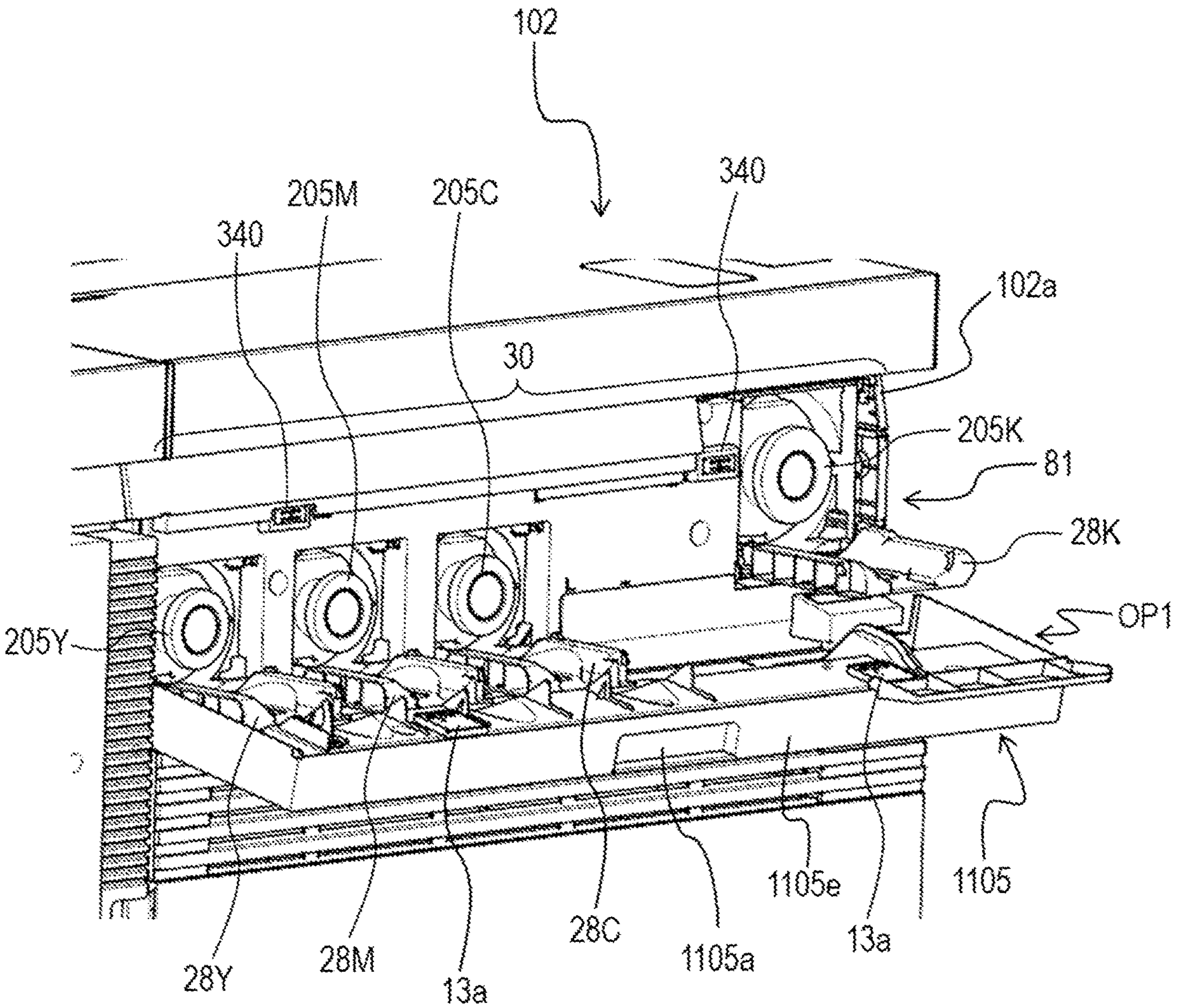
FIG. 6 is a perspective view of the image forming portion with a toner bottle replacement door and toner scattering prevention doors open.

FIG. 6 is a perspective view of the image forming portion 102 with the toner bottle replacement door 1105 and toner scattering prevention doors 28 open for replacement of the toner bottles 205. The toner bottle replacement door 1105, which is an openable and closable door for opening and closing a first opening portion 81, is provided rotatably on a front side of a main body 102*a* of the image forming portion 102. As illustrated in FIG. 6, toner containing portions 30 are provided inside the first opening portion 81. The toner bottles 205Y, 205M, 205C, and 205K configured to contain the respective color toners to be supplied to the image forming stations 200Y, 200M, 200C, and 200K as the image forming units are mounted into the toner containing portions 30, respectively. The toner scattering prevention doors 28Y, 28M, 28C, and 28K, which are provided to prevent scattering of the toners into the image forming portion 102, are openably and closably provided to the toner containing portions 30. The toner scattering prevention doors 28Y, 28M, 28C, and 28K cover the toner containing portions 30, into which the toner bottles 205Y, 205M, 205C, and 205K are mounted, respectively.

The toner bottle replacement door 1105 is movable between a first open position OP1 (FIG. 6) for exposing the first opening portion 81 and a first closed position (FIG. 5) for closing the first opening portion 81. The toner bottle replacement door 1105 is openably and closably provided to the main body 102*a* so as to open and close the toner containing portions 30. When the toner bottle replacement door 1105 is located at the first closed position (FIG. 5), the toner bottle replacement door 1105 covers the toner containing portions 30. After the toner bottle replacement door 1105 is opened to expose the toner containing portions 30, the toner scattering prevention doors 28 are opened in accordance with an instruction input from the operation portion 104. Then, an operator can make access to each of the toner bottles 205. The operator can remove the old toner bottles 205 through the first opening portion 81 and removably mount new toner bottles 205 into the toner containing portions 30 through the first opening portion 81. This configuration enables the operator to perform replacement work for the toner bottles 205 without opening the front door 1103.

As illustrated in FIG. 6, magnets 340 are provided to the main body 102*a* of the image forming portion 102. Magnetizable sheet metals 13*a* are provided onto the toner bottle replacement door 1105. When the toner bottle replacement door 1105 is closed and located at the first closed position, the magnetizable sheet metals 13*a* on the toner bottle replacement door 1105 are attracted to the magnets 340 on the main body 102*a* by a magnetic force to thereby maintain the toner bottle replacement door 1105 in the first closed position (FIG. 5). The handle portion 1105*a*, which is a recessed portion, is formed in an upper surface portion 1105*e* of the toner bottle replacement door 1105. The operator can insert his/her fingers in the handle portion 1105*a*.

The operator inserts his/her fingers into the handle portion 1105*a* to pull the handle portion 1105*a* in the forward direction F against an attracting force of the magnets 340 to attract the magnetizable sheet metals 13*a* to rotate the toner bottle replacement door 1105 about the rotation axis. In this manner, the toner bottle replacement door 1105 is moved to the first open position OP1. As is apparent from FIG. 6, the rotation axis of the toner bottle replacement door 1105 extends in a width direction (right-left direction) of the image forming portion 102, and is set at a lower end of the toner bottle replacement door 1105 in the vertical direction. This rotation axis allows the worker to make access to the toner containing portions 30 through the first opening portion 81. When the magnetizable sheet metals 13*a* are released from the attracting force of the magnets 340 by an operation performed by the worker, the toner bottle replacement door 1105 rotates downward under its own weight about the rotation axis.

Figure 7:
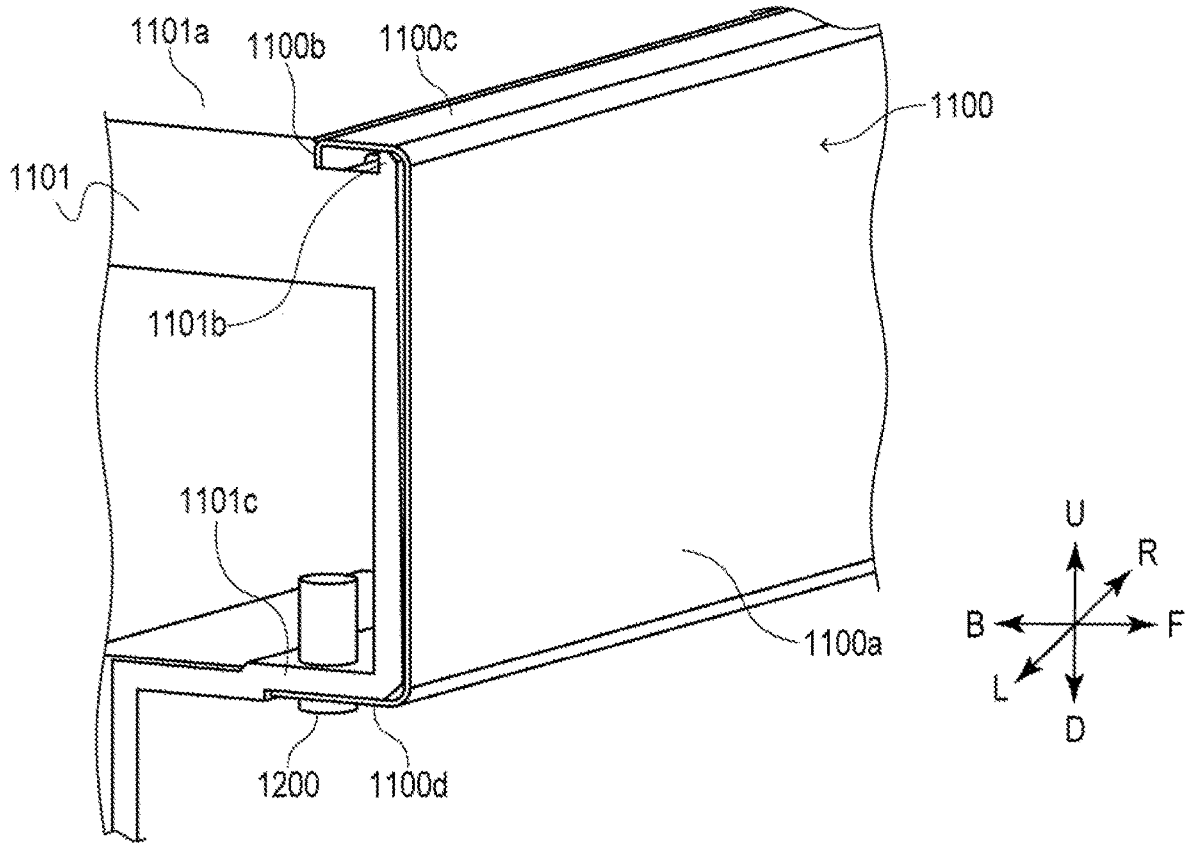
FIG. 7 is a sectional view of a ferromagnetic cover mounted to an upper surface cover.

A shape of the ferromagnetic cover 1100 according to the first embodiment is described with reference to FIG. 7. FIG. 7 is a sectional view of the ferromagnetic cover 1100 mounted to the upper surface cover 1101. The ferromagnetic cover 1100 is formed by bending a flat plate made of SUS 403. The ferromagnetic cover 1100 includes a front surface portion 1100*a*, a back surface portion 1100*b*, an upper surface portion 1100*c*, and a bottom surface portion 1100*d*. The front surface portion 1100*a* is located on the front side of the image forming portion 102. The back surface portion 1100*b* is located on a side opposite to the front surface portion 1100*a* in the front-back direction of the image forming portion 102, and is parallel to the front surface portion 1100*a*. The upper surface portion 1100*c* is parallel to the flat surface portion 1101*a* of the upper surface cover 1101. The upper surface portion 1100*c* is connected to an upper end portion of the front surface portion 1100*a*. The bottom surface portion 1100*d* is connected to a lower end portion of the front surface portion 1100*a*. The back surface portion 1100*b* is connected to a back end portion of the upper surface portion 1100*c*. The front surface portion 1100*a* and the back surface portion 1100*b* extend in the vertical direction in parallel to each other. The upper surface portion 1100*c* and the bottom surface portion 1100*d* extend in a horizontal direction in parallel to each other. The ferromagnetic cover 1100 described in the embodiment is a single metal sheet. The front surface portion 1100*a*, the back surface portion 1100*b*, the upper surface portion 1100*c*, and the bottom surface portion 1100*d* are formed by processing the single metal sheet.

In the embodiment, the ferromagnetic cover 1100 is mounted to the upper surface cover 1101 so that mounting screws are not exposed on the front surface portion 1100*a* in terms of design quality. Such mounting improves the appearance quality of the image forming apparatus 101. More specifically, the upper surface portion 1100*c* of the ferromagnetic cover 1100 is engaged with an upper engagement portion 1101*b* of an upper portion of the upper surface cover 1101. The bottom surface portion 1100*d* of the ferromagnetic cover 1100 is fixed to a lower engagement portion 1101*c* of a lower portion of the upper surface cover 1101 with screws 1200. As a result, the screws 1200 are invisible from a position where the worker is standing, specifically, from the front side of the image forming apparatus 101.

The ferromagnetic cover 1100 can also be bonded to the upper surface cover 1101 with an adhesive. When the ferromagnetic cover 1100 is bonded to the upper surface cover 1101 with an adhesive, however, it becomes difficult to remove the ferromagnetic cover 1100 from the upper surface cover 1101, which may reduce recyclability of the image forming apparatus 101. Thus, as in the embodiment, it is preferred that the ferromagnetic cover 1100 be mounted to the upper surface cover 1101 with the screws 1200 provided at the positions where the worker using the image forming apparatus 101 can hardly view the screws 1200.

The ferromagnetic cover 1100 is located on the front side of the image forming apparatus 101. Thus, the worker may often come into contact with the upper surface portion 1100*c* of the ferromagnetic cover 1100. When the back surface portion 1100*b* is not formed and a back end edge of the upper surface portion 1100*c* is exposed above the upper surface of the upper surface cover 1101, a document may be caught by the back end edge of the upper surface portion 1100*c*. Thus, the back surface portion 1100*b* is formed by bending a back end of the upper surface portion 1100*c*. The back surface portion 1100*b* can prevent the worker from coming into contact with an edge of the ferromagnetic cover 1100 or a document from being caught by the edge of the ferromagnetic cover 1100. The formation of the ferromagnetic cover 1100 into the shape described above enables the arrangement of the ferromagnetic cover 1100 made of a sheet metal on the uppermost portion of the front surface of the image forming portion 102 while ensuring design quality, workability, and safety. According to the first embodiment, an instruction sheet can be stuck with a magnet at a position which is easy for the worker to see.

In the embodiment, the upper surface cover 1101 is formed separately from other covers, and is fixed to a support frame (not shown) for supporting the image forming stations 200Y, 200M, 200C, and 200K as the image forming units, and other units. The upper surface cover 1101 is removably mounted to the support frame with screws (not shown). In the embodiment, the ferromagnetic cover 1100 is fixed onto the upper surface cover 1101. However, the ferromagnetic cover 1110 may also be directly fixed to a frame (not shown).

Further, in the embodiment, the ferromagnetic cover 1100 is provided to the image forming portion 102 of the image forming apparatus 101. As illustrated in FIG. 1, however, a ferromagnetic cover 2000 may be additionally provided to an upper portion of the fixing conveyance portion 103 on its front side. When the ferromagnetic cover is additionally provided to the fixing conveyance portion 103 as described above, an area to which the worker can stick an instruction sheet with use of a magnet can be increased. Thus, workability can be improved. Further, by providing the ferromagnetic cover 2000 having the same width as that of the ferromagnetic cover 1100 in an up-down direction, which is provided to the image forming portion 102, the appearance quality of the image forming apparatus 101 is improved.

Second Embodiment

Figure 8:
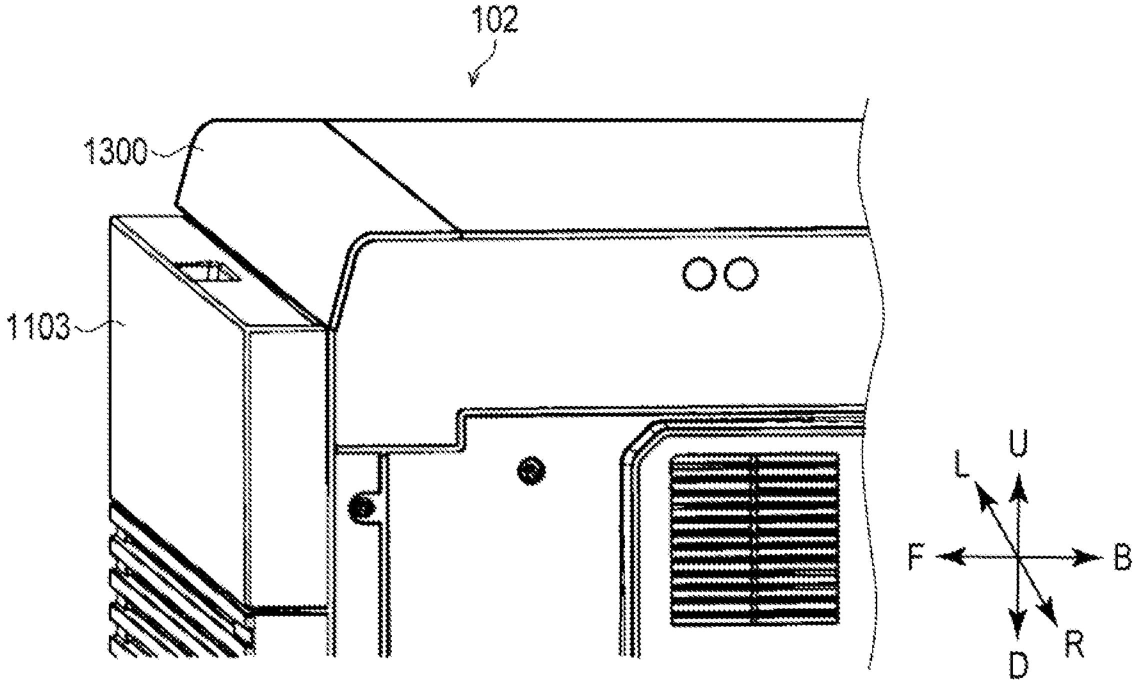
FIG. 8 is a view of a ferromagnetic cover according to a second embodiment.

In the first embodiment, a width of the upper surface portion 1100*c* in the front-back direction is set small to prevent an instruction sheet from being stuck on the upper surface portion 1100*c* of the ferromagnetic cover 1100 with use of a magnet. In this manner, an instruction sheet is stuck not to the upper surface of the image forming apparatus 101 but to the front surface thereof so as not to hinder work performed by the worker on the flat surface portion 1101*a* of the upper surface cover 1101. However, a ferromagnetic cover may be provided so as to extend over a border between the upper surface and the front surface of the image forming portion 102 in view of design quality. FIG. 8 is a view of a ferromagnetic cover 1300 according to a second embodiment. The ferromagnetic cover 1300 is provided to extend over a border between an upper surface and a front surface of an image forming portion 102 of an image forming apparatus 101. According to the second embodiment, a worker can also stick an instruction sheet to the upper surface of the image forming portion 102 with use of a magnet. Thus, the instruction sheet can be stuck with a magnet at a position which is easy for the worker to see.

Third Embodiment

Figure 9:
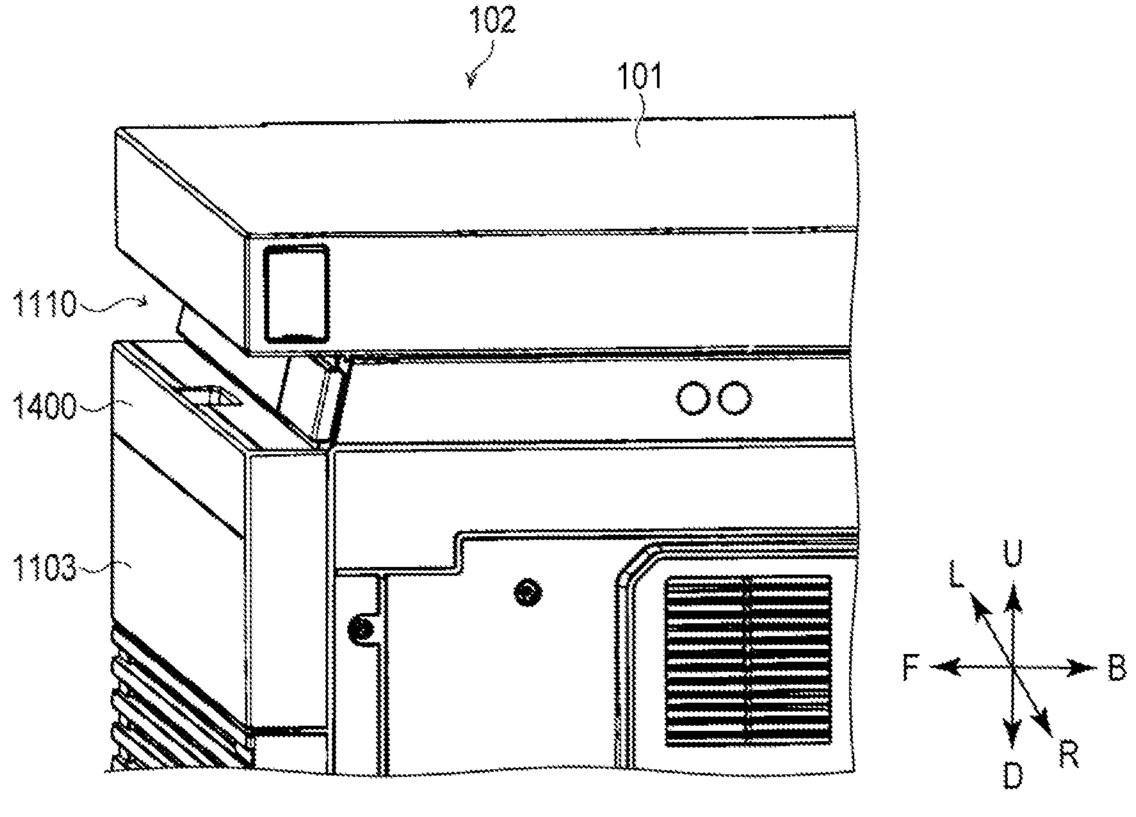
FIG. 9 is a view of a ferromagnetic cover according to a third embodiment.

FIG. 9 is a view of a ferromagnetic cover 1400 according to a third embodiment. The ferromagnetic cover (second cover) 1400 is mounted to an upper portion of a front surface of a front door (first cover) 1103. According to the third embodiment, a worker can stick an instruction sheet with use of a magnet at a position on an upper part of a front surface of an image forming portion 102. Thus, the instruction sheet can be stuck with a magnet at a position which is easy for the worker to see.

Fourth Embodiment

Figure 10:
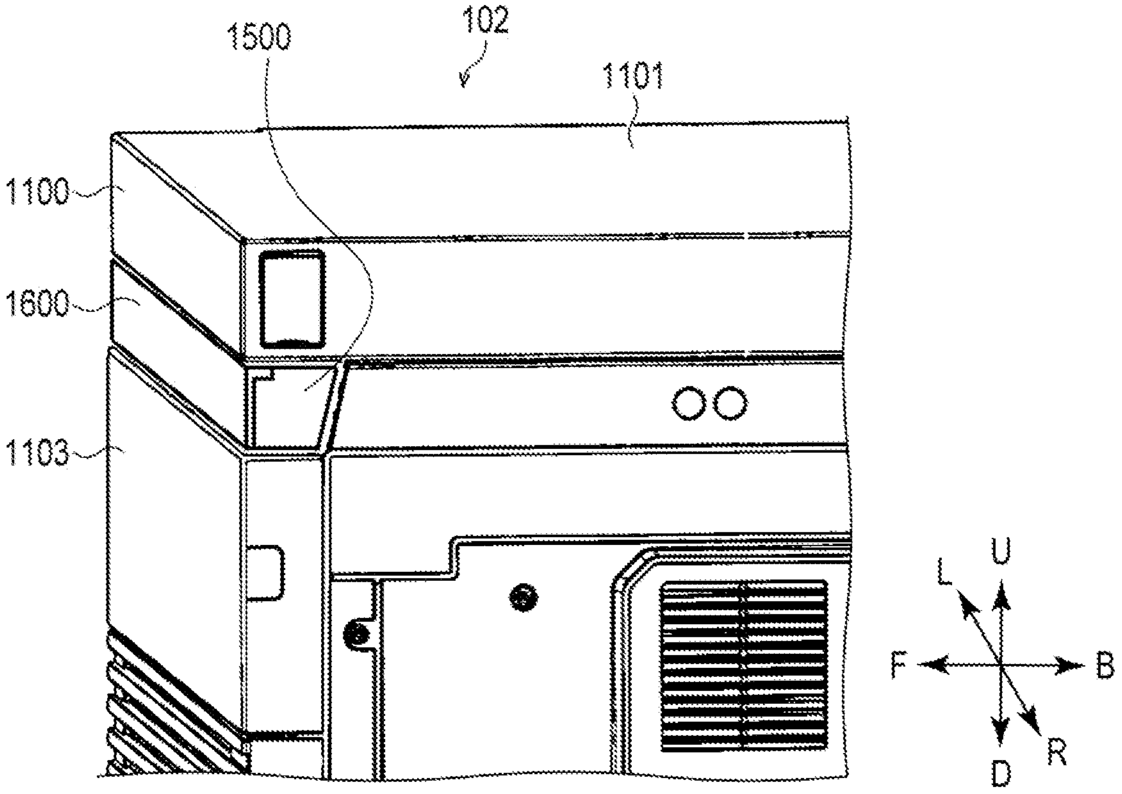
FIG. 10 is a view of a ferromagnetic cover according to a fourth embodiment.

FIG. 10 is a view of a ferromagnetic cover 1600 according to a fourth embodiment. A gap cover (third cover) 1500 is provided to an image forming portion 102 of an image forming apparatus 101 to be fitted between an upper surface cover 1101 and a front door (first cover) 1103. The ferromagnetic cover (second cover) 1600 is mounted to a front surface of the gap cover 1500. The ferromagnetic cover 1600 may be formed integrally with the gap cover 1500. Further, the ferromagnetic cover 1600 may be eliminated, and the gap cover 1500 may be made of a ferromagnetic material. According to the fourth embodiment, a worker can also stick an instruction sheet to an upper surface of the image forming portion 102 with use of a magnet. Thus, the instruction sheet can be stuck with a magnet at a position which is easy for the worker to see.

Other Embodiments

Further, in the embodiments, there has been described, as an example, the image forming apparatus 101 including two casings, which correspond to the image forming portion 102 and the fixing conveyance portion 103, respectively. However, an image forming apparatus may include only one casing, and a ferromagnetic cover such as the ferromagnetic cover 1100 similar to those described in the embodiments may be provided.

Figure 11:
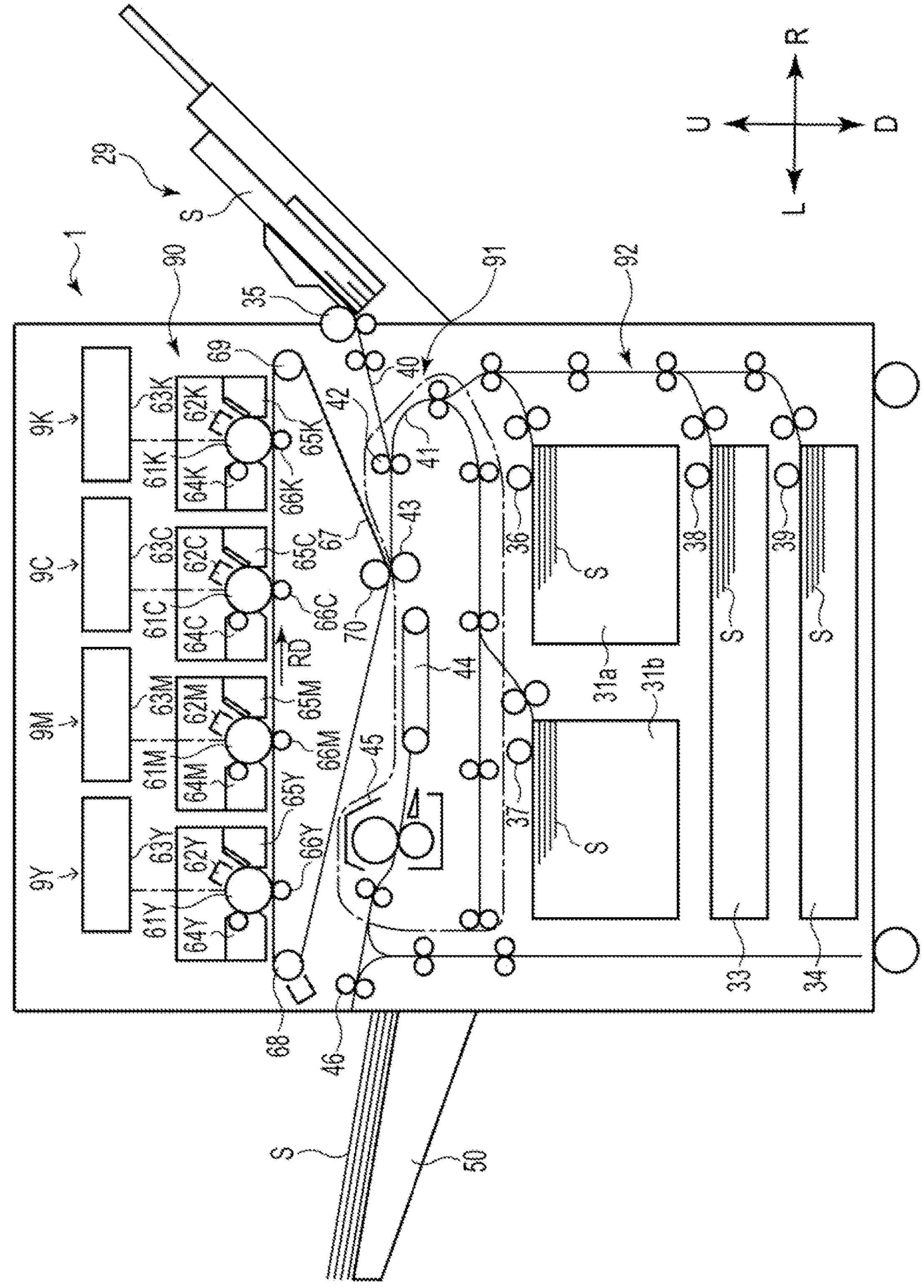
FIG. 11 is a sectional view of an image forming apparatus according to another embodiment.

FIG. 11 is a sectional view of an image forming apparatus 1 different from those described in the embodiments. The image forming apparatus 1 is different from those of the embodiments in that the image forming apparatus 1 includes only one casing. Specifically, units configured to form toner images on a sheet S and a unit configured to fix the toner images to the sheet S are provided in one casing. The image forming apparatus 1 illustrated in FIG. 11 is a color printer that employs an electrophotographic method to form a color image on the sheet S. The image forming apparatus 1 employs an intermediate transfer tandem system in view of advantages such as flexibility to handle a wide variety of sheets S and excellent productivity in printing. In the intermediate transfer tandem system, image forming units 9Y, 9M, 9C, and 9K for four colors are arranged side by side above an intermediate transfer belt 67. Suffixes Y, M, C, and K to the reference symbols stand for yellow, magenta, cyan, and black, respectively. The image forming apparatus 1 is not limited to a printer, and may be a copying machine, a multifunction peripheral, a facsimile machine, or a printing machine.

The image forming apparatus 1 includes a sheet feeding portion 92, a sheet conveying apparatus 91, and an image forming portion 90. The sheet feeding portion 92 feeds the sheet S. The sheet conveying apparatus 91 conveys the sheet S fed by the sheet feeding portion 92. The image forming portion 90 forms an image on the sheet S conveyed by the sheet conveying apparatus 91. The sheet feeding portion 92 includes sheet storage portions 29, 31*a*, 31*b*, 33, and 34, and pickup rollers 35, 36, 37, 38, and 39.

The image forming portion 90 includes four image forming units 9Y, 9M, 9C, and 9K. The image forming units 9Y, 9M, 9C, and 9K include photosensitive members 61Y, 61M, 61C, and 61K, charging devices 62Y, 62M, 62C, and 62K, exposure devices 63Y, 63M, 63C, and 63K, and developing devices 64Y, 64M, 64C, and 64K, respectively. The image forming portion 90 further includes primary transfer devices 66Y, 66M, 66C, and 66K, and photosensitive member cleaners 65Y, 65M, 65C, and 65K. The image forming portion 90 further includes the intermediate transfer belt 67. Toner images formed on the photosensitive members 61Y, 61M, 61C, and 61K are transferred onto the intermediate transfer belt 67 by the primary transfer devices 66Y, 66M, 66C, and 66K. The image forming portion 90 further includes a secondary transfer roller 43 for transferring a full-color toner image, which has been formed by transferring the toner images onto the intermediate transfer belt 67 in an overlapping manner, onto the sheet S.

The intermediate transfer belt 67 is looped in a tensioned state around a driving roller 68, a tension roller 69, and a secondary transfer inner roller 70. The intermediate transfer belt 67 is rotated by the driving roller 68 in a direction indicated by an arrow RD. The sheet conveying apparatus 91 includes conveyance paths 40 and 41 through which the sheet S fed by the pickup rollers 35, 36, 37, 38, and 39 passes. The sheet conveying apparatus 91 further includes registration rollers 42 for conveying the sheet S to a nip (secondary transfer portion) defined by the intermediate transfer belt 67 and the secondary transfer roller 43. The sheet conveying apparatus 91 further includes a fixing device 45 provided on a downstream side of the secondary transfer roller 43 in a direction of conveying the sheet S. The sheet S onto which the toner image has been transferred by the secondary transfer roller 43 is conveyed to the fixing device 45 by a pre-fixing conveyance belt 44. The fixing device 45 heats and pressurizes the sheet S carrying the toner image transferred thereto to fix the toner image onto the sheet S, thereby forming a color image on the sheet S. The sheet S with the image thereon is delivered by delivery rollers 46 to a delivery tray 50.

In current commercial printing industry, as illustrated in FIG. 11, a front side to back side image alignment function and media-enabling functions are additionally provided to a related-art office digital multifunction peripheral so that the resulting digital multifunction peripheral is used as a compact commercial printing machine in some cases. As described above, the commercial printing machine manufactured by adding required functions to the digital multifunction peripheral is suitable mainly for diversified small-lot printing.

In diversified small-lot printing, each print job may be performed under different conditions such as a kind of paper sheet, a sheet size, half fold, punching, and staple-binding. Thus, in actual printing work, a worker (operator) often performs printing work in accordance with an instruction sheet of, for example, A4 size, which describes conditions of a print job. Thus, in order to efficiently proceed with the printing work without mistaking the conditions of the print job, it is necessary to display the instruction sheet in a place where the worker can clearly view and read the instruction sheet. Thus, as in the embodiments described above, it is requested that the image forming apparatus according to the embodiment allow an instruction sheet to be stuck with use of a magnet at a position where a worker can clearly view and read the instruction sheet.

Thus, similarly to the first embodiment, also in the image forming apparatus 1 illustrated in FIG. 11, a ferromagnetic cover 2100 is provided to an upper portion of a front surface of the image forming apparatus 1 to allow an instruction sheet to be stuck with a magnet at a position which is easy for the worker to see. Details of a configuration of the ferromagnetic cover 2100 are described below.

Figure 12:
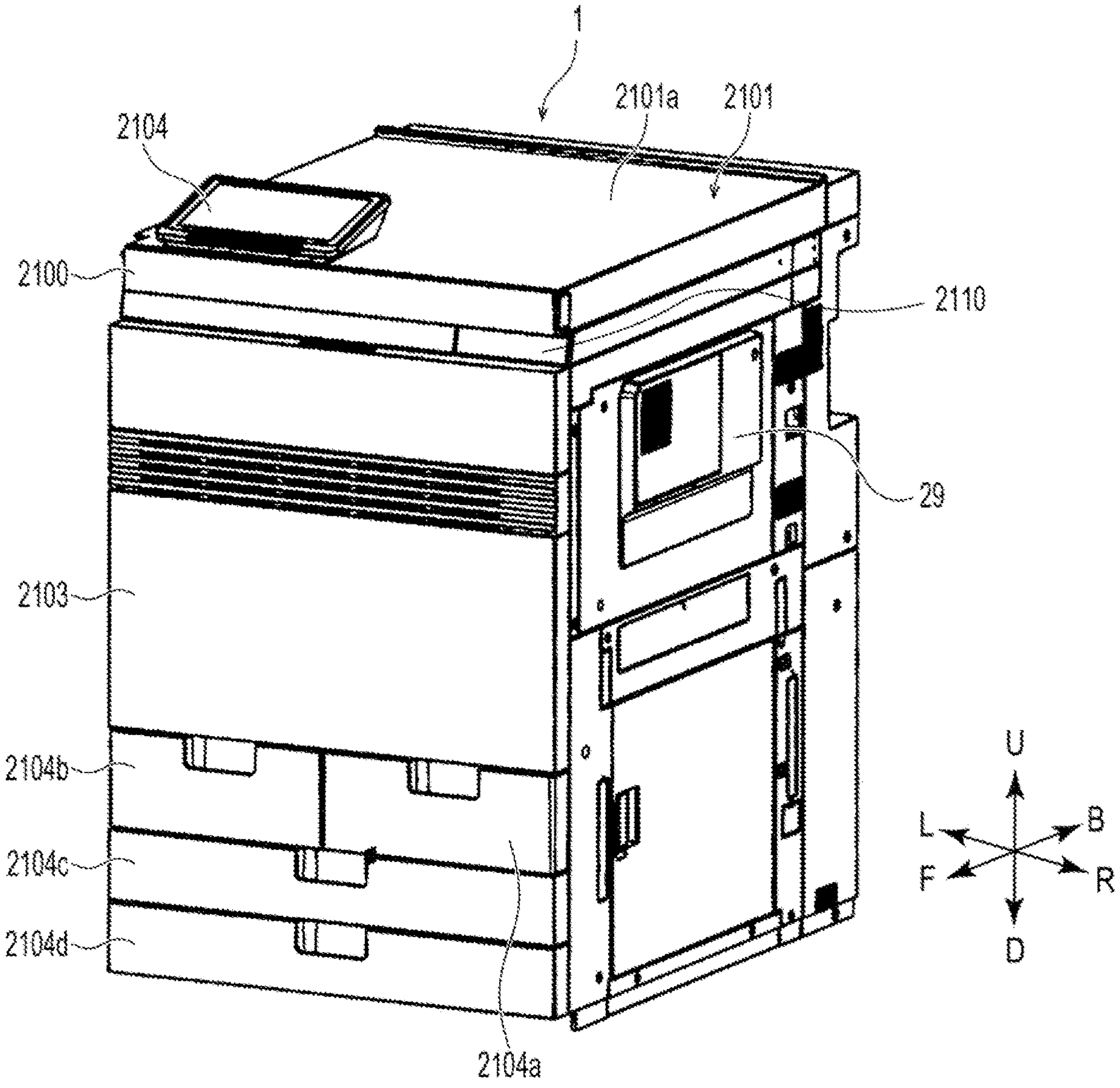
FIG. 12 is a perspective view of an image forming apparatus according to a further embodiment.

FIG. 12 is a perspective view of an image forming apparatus 1. The ferromagnetic cover (second cover) 2100 is provided to an upper portion of the image forming apparatus 1 on its front side. The upper surface cover 2101 is provided to a top of the image forming apparatus 1. The upper surface cover 2101 forms an upper surface of the image forming apparatus 1. A flat surface portion 2101*a* is located as an upper portion of the upper surface cover 2101 so as to be used by a user as a working space. An operation portion 2104 is provided on the upper surface cover 2101 at a position closer to a front side of the image forming apparatus 1. The user can perform work on the flat surface portion 2101*a* of the upper surface cover 2101. The work includes alignment of the sheets S delivered to the delivery tray 50 and checking for an image defect in the image formed on the sheet S.

A front door (first cover) 2103 is provided on the front side of the image forming portion 1. The front door 2103 is openable and closable about its one side as a center of rotation. At a time of maintenance on the image forming apparatus 1 or fixing a jam therein, a user opens the front door 2103 to make access to an inside of the image forming apparatus 1 so as to perform work. Each covers 2104*a*, 2104*b*, 2104*c*, and 2104*d* for the sheet storage portions 31 (31*a*, 31*b*), 33, and 34 for storing the sheet S are provided to a lower portion of the image forming apparatus 1. The upper surface cover 2101, the front door 2103, and the covers 2104*a*, 2104*b*, 2104*c*, and 2104*d* are made of a resin. A resin material is, for example, a blend of a polycarbonate (PC) resin and an acrylonitrile-butadiene-styrene (ABS) resin (PC-ABS resin). The PC-ABS resin is a thermoplastic resin having features of both the PC resin and the ABS resin.

The ferromagnetic cover 2100 is provided to an uppermost portion of the front surface of the image forming apparatus 1. The ferromagnetic cover 2100 is made of a ferromagnetic material such as stainless use steel (SUS) 403, iron, or nickel. It is preferred that the ferromagnetic cover 2100 be made of any one of SUS 400 series stainless steels. The stainless steels of SUS 400 series include martensitic stainless steels and ferritic stainless steels. In the embodiment, the ferromagnetic cover 2100 is made of SUS 403 in terms of design quality and scratch resistance. For example, the ferromagnetic cover 2100 made of a ferromagnetic material is only required to be partially or entirely formed of a stainless steel plate made of a ferromagnetic material. In the embodiment, the ferromagnetic cover 2100 is formed by bending a stainless steel plate made of SUS 403. However, the ferromagnetic cover 2100 may also be formed by mounting a stainless steel plate made of SUS 403 onto a cover made of a resin material.

According to the embodiment, an instruction sheet or a piece of memo paper can be removably stuck with a magnet (permanent magnet) to the ferromagnetic cover 2100 provided to the uppermost portion of the front surface of the image forming apparatus 1.

Further, as illustrated in FIG. 12, a recessed portion 2110 is defined between the ferromagnetic cover 2100 of the image forming apparatus 1 and the front door 2103. To remove a piece of memo paper that is stuck to the ferromagnetic cover 2100 with a magnet, the worker can easily remove the piece of memo paper by inserting fingers into the recessed portion 2110 and touching a back surface of the piece of paper. The recessed portion 2110 secures a space behind the back surface of the piece of memo paper, which further improves workability.

According to the embodiment, an instruction sheet can be stuck with a magnet at a position which is easy for a worker to see.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A conveying apparatus for an image forming system, comprising:

a conveying unit configured to convey a recording medium;

a top surface cover which is provided to a top surface of the conveying apparatus in a vertical direction and forms at least a top part of an appearance of the conveying apparatus; and a front surface cover which is provided to a front surface of the conveying apparatus in a front-back direction and forms at least a front part of the appearance, wherein the front surface cover includes a ferromagnetic material portion provided to be visible as the front part of the appearance.

2. The conveying apparatus according to claim 1, wherein the ferromagnetic material portion includes:

a front portion which is located on the front surface and extends in the vertical direction and in a horizontal direction crossing both the vertical direction and the front-back direction, a top portion which is connected to an upper end of the front portion and extends in the front-back direction and the horizontal direction, a back portion which is connected to a back end of the top portion and extends in the vertical direction and the horizontal direction, and a bottom portion which is connected to a lower end of the front portion and extends in the front-back direction and the horizontal direction.

3. The conveying apparatus according to claim 2, wherein the bottom portion is fixed to the top surface cover by a screw.

4. The conveying apparatus according to claim 3, wherein the back portion of the ferromagnetic material portion intrudes below the top surface of the conveying apparatus.

5. The conveying apparatus according to claim 2, wherein the top portion of the ferromagnetic material portion and the top surface cover are aligned in the front-back direction.

6. The conveying apparatus according to claim 1, further comprising a second front surface cover which is provided below the front surface cover and forms at least a second front part of the appearance.

7. The conveying apparatus according to claim 6, further comprising a recessed portion between the front surface cover and the second front surface cover.

8. The conveying apparatus according to claim 7, wherein the second front surface cover has a handle portion in an upper end portion of the second front surface cover, and wherein the recessed portion is formed to provide access to the handle portion.

9. The conveying apparatus according to claim 6, wherein the second front surface cover is openably and closably provided to the conveying apparatus.

10. The conveying apparatus according to claim 6, further comprising:

a front door which is provided to the front surface of the conveying apparatus in the front-back direction so as to be located below the second front surface cover in the vertical direction, wherein the second front surface cover is rotatable in an axis extending in a horizontal direction crossing both the vertical direction and the front-back direction, and wherein the front door is rotatable in an axis extending in the vertical direction.

11. The conveying apparatus according to claim 6, wherein the second front surface cover includes a resin material portion which forms the second front part of the appearance.

12. The conveying apparatus according to claim 1, wherein the top surface cover includes a resin material portion which forms the top part of the appearance.

13. The conveying apparatus according to claim 1, wherein a ferromagnetic material of the ferromagnetic material portion is any one of SUS 400 series stainless steels.

14. The conveying apparatus according to claim 1, further comprising an image forming unit configured to form an image on the recording medium conveyed by the conveying unit.

15. An image forming system comprising:

the conveying apparatus according to claim 1; and a second conveying apparatus configured to convey the recording medium.

* * * * *